Aug. 4, 1959   J. E. McMILLAN   2,897,539
DISINTEGRATING REFRACTORY METALS
Filed March 25, 1957   2 Sheets-Sheet 1

INVENTOR.
John E. McMillan
BY
Agent

United States Patent Office 2,897,539
Patented Aug. 4, 1959

2,897,539

DISINTEGRATING REFRACTORY METALS

John E. McMillan, Henderson, Nev., assignor to Titanium Metals Corporation of America, New York, N.Y., a corporation of Delaware Application March 25, 1957, Serial No. 648,310

8 Claims. (Cl. 18—2.6)

This invention relates to disintegration of metals and more particularly to the disintegration of refractory or high melting point metals such as, for example, steel, titanium, zirconium, tungsten and molybdenum.

Refractory metals such as titanium or zirconium as well as other metals are difficult to disintegrate into relatively small particles. Reduction by mechanical cutting or shearing means is laborious and expensive due to their hardness and strength. Yet a serious need exists for methods for disintegrating such metals, particularly where recycled scrap metal is to be reused as part of a compacted electrode to be melted into an ingot in a consumable electrode arc furnace. Breaking down massive scrap is essential to make possible accurate analysis and to permit effective blending with virgin metal which may be in the form of granules, sponge or powder.

It is therefore a principal object of this invention to provide an improved method and apparatus for disintegrating metals. Another object is to provide a method and apparatus for disintegrating metals without contamination by atmospheric gases. A further object is to provide a method and apparatus for disintegrating metal in which the size and character of the metal particles produced may be controlled. A still further object of this invention is to provide a method and apparatus for disintegrating and purifying refractory metals. These and other objects of this invention will be apparent from the following description thereof and from the annexed drawing in which:

Figure 1:
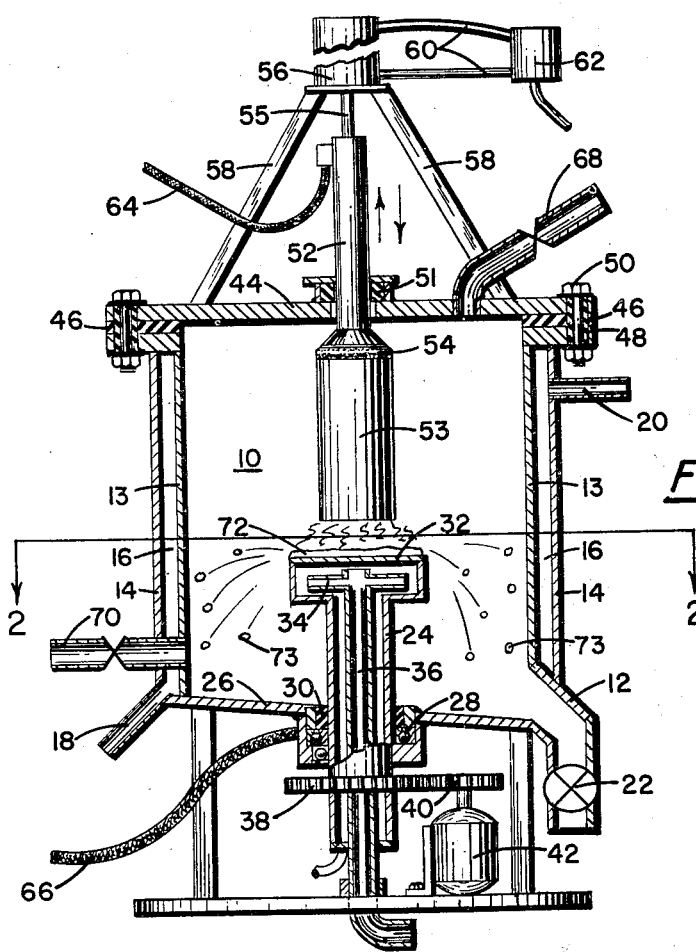
Fig. 1 illustrates a sectional side view of apparatus embodying features of this invention.
Figure 2:
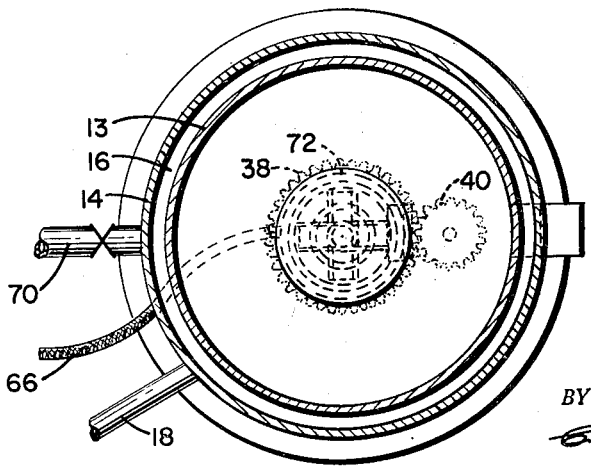
Fig. 2 illustrates a horizontal section of the apparatus of Fig. 1 taken along the line 2—2.

Referring now to Figs. 1 and 2, the apparatus shown comprises a cylindrical shell 10 which is provided in the bottom with a discharge spout 12 for convenient discharge of particulate metal formed therein. The shell 10 is provided with sidewalls 13 and an outer shell 14, the space between the inner and outer walls 12 and 14 forming jacket 16 through which is passed cooling fluid such as water, entering at connector 18 and discharging through outlet 20, to provide cooling means associated with said sidewall. The spout 12 may be closed and controlled by a suitable conventional gate or valve device as at 22. Hollow pedestal 24 passes through the bottom 26 of the shell 10 and is suitably provided with bearings 28 and seal 30. Fixedly attached to the top of pedestal 24 is table 32 which is preferably horizontal and hollow and which contains cooling fluid distributing arms 34 which are supplied by central pipe 36. Pedestal 24 and attached table 32 is rotated by gear 38 which is fixedly attached to pedestal 24 external of shell 10, and which is in turn driven by pinion 40 connected to motor 42.

The top 44 of the shell 10 is electrically isolated therefrom by provision of insulating gasket 46, located between extending shell flange 48 and top 44, these elements being firmly assembled together by insulated bolts 50. Passing through top 44 and provided in this vicinity with sliding seal 51, is electrode carrier 52 for suspending an electrode 53.

Means are employed for attaching electrode 53 of metal to be disintegrated to the foot of carrier 52 inside shell 10 which in the embodiment illustrated comprise temporary weld 54. The top of electrode carrier 52 is fixedly attached to the piston rod 55 of hydraulic cylinder 56 which is itself rigidly supported in proper alignment by support members 58. Oil lines 60 from the bottom and top of hydraulic cylinder 56 are supplied from a conventional oil pumping device 62. It will be apparent that oil pumped by the device 62 will actuate the piston in cylinder 56 and thus raise or lower the electrode 53 with respect to table 32 to maintain a desired spacing between these elements for play of an electric arc. The pumping device 62 is preferably controlled by an electrical circuit which responds to changes in the arc current or voltage so that proper motion of the electrode carrier 52 will result in substantially uniform melting of electrode 53. Such circuits and controls are well known in the electrical art, are commercially available, and themselves form no part of this invention.

Electric power for the arc is supplied to the electrode 53 through carrier 52 and upper connector 64, and to the rotating table 32 through tube 24 and bearing 28 and lower connector 66. Valved connecting pipes 68 and 70 provide means for evacuating the shell 10 or providing therein an atmosphere or flow of inert gas.

In operation of the apparatus described, a refractory metal, for example titanium, is formed into an electrode 53. This electrode may be formed in any convenient manner depending on the character of the metal to be disintegrated. For example, it may be formed by pressing together odd and vari-sized pieces of crude, secondary, impure or pure metal. It may be machined or otherwise produced from a larger slab of such metal, or may be formed by welding or sintering together individual pieces. The electrode 53 is then fastened to its carrier 52 by a temporary weld at 54, and the top 44 with electrode in place is positioned and secured to side walls of shell 10 by tightening bolts 50.

The enclosed space inside the shell 10 is then rendered devoid of contaminating gases such as air. This may be accomplished by evacuation, suitably through pipe 68 to which may be connected a vacuum pump, not shown, and the residual atmosphere reduced to a pressure generally below 1 millimeter of mercury absolute. If desired, helium, argon, or other inert gas may then be admitted through pipe 70 to provide an inert gas atmosphere therein. Circulating water is then caused to flow through the side wall jacket 16 and also through central pipe 36 and pipes 34 to suitably cool the table 32. Power connections are made through connectors 64 and 66 so that an arc may be struck between the electrode 53 and table 32. Metal melted from the bottom of electrode 53 by the action of the electric arc will first form a solidified layer 72 on table 32 and subsequent metal melted from electrode 53 will remain temporarily molten and then be thrown off the rotating table 32 by action of centrifugal force forming discrete particles such as globules 73. The refractory metal forms a molten pool or puddle which is continually being thrown off rotating table 32 in the form of globules or droplets 73. These globules solidify and fall to the bottom of shell 10 as discrete particles. If desired, inert gas may be continually circulated through the disintegrating chamber by feeding in through pipe 70 and passing out through pipe 68. At suitable intervals the disintegrated product may be removed from the interior of the disintegrating chamber through valve arrangement 22.

Preferably the layer 72 of metal being melted is initially placed on the surface of the table 32 before striking the arc. A disk, for example of titanium (when disintegrating a titanium electrode), may be fixedly attached to the top surface of table 32 before arcing and melting is commenced. This provides an initial surface and contact material of the same composition as the electrode being melted and prevents contamination of the product by melting and removal of table metal and also prevents damage to the table by concentration of heat in one small area.

The size and space relationship between the rotating table 32 and the side walls 13 of shell 10 will affect the character of the discrete particles thrown off the table. If the globules solidify before striking the side walls 13, the product will be in the form of generally spherical particles. If the side walls 13, however, are close to the rotating table 32 so that the globules are impinged on the cool side walls before they are solidified, the disintegrated particles will be in the form of flattened disks or of irregular shape. Generally speaking, the table speed will control the fineness of the globules thrown off the rotating table. The cooling effect of the inert gas may be controlled by control of its flow and temperature, and various conditions determined by ordinary skill and engineering experience may be employed to obtain the specific type of product necessary or desirable.

Figure 3:
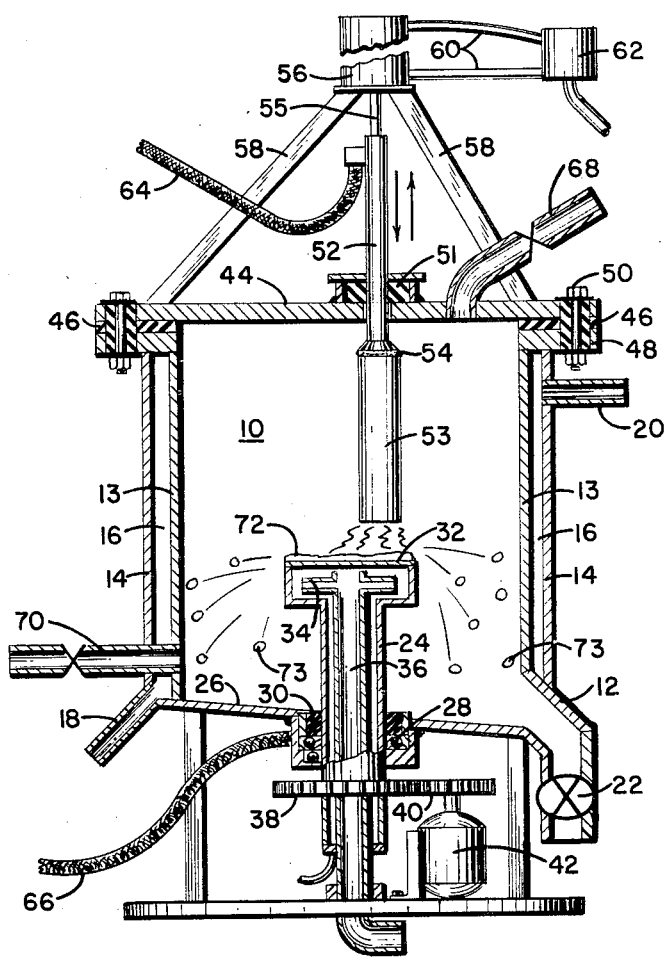
Fig. 3 illustrates a modified form of the type of apparatus illustrated in Fig. 1.

The embodiment illustrated in Fig. 3 is particularly valuable when the electrode diameter is small compared to the diameter of the rotating table. As shown, the location of the electrode carrier 52 and associated supporting and actuating mechanism results in an off-center relationship with respect to the top of table 32. This results in the arc being spread over a continually moving surface of the metal on the table and prevents a central dishing or cavity producing effect such as might occur if a concentrated arc was continually applied to the center thereof.

The process of this invention in broad terms involves melting a refractory metal body progressively in a confined space devoid of contaminating gases and subjecting the metal while molten to the action of centrifugal force by imparting a rotating motion thereto. The action of centrifugal force subdivides the molten metal into discrete globules which are cooled and solidified. It is a unique and advantageous feature that during the disintegration process, impurities in the original metal which are volatile under the temperature and pressure conditions imposed, will be eliminated, at least to an appreciable degree. Best results will be obtained when the operation is carried out under less than atmospheric pressure, generally less than 1 millimeter of mercury absolute, which will provide a space which is for all practical purposes devoid of air. This, in combination with the heat of the arc and the surface exposed during subdivision, provides best opportunity for release and elimination of volatile materials. The impurities thus separated may be condensed on cool surfaces in the upper part of the apparatus. If desired, impurities may effectively be removed by an inert sweep gas stream passing through the enclosed space defined by the shell, and collected in any convenient manner. The following examples will illustrate embodiments of this process.

*Example 1*

Apparatus of the type illustrated in Figs. 1 and 2 was employed. An electrode 4 inches in diameter and 10 inches long was formed by welding together vari-sized pieces of scrap titanium metal. This was employed as a consumable electrode and melted by an arc playing between its bottom and a 6 inch table rotating at 200 r.p.m. The melting metal first formed a solid layer on the table surface, which was cooled from inside, and then formed a molten pool which was thrown off by centrifugal force in the form of globules. Inert gas was circulated through the apparatus. The globules solidified into roughly spherical discrete particles up to about ⅛ inch in diameter and were collected in the bottom of the apparatus.

*Example 2*

Apparatus of the same type shown in Fig. 3 was employed. An electrode 2 inches in diameter and 10 inches long was formed by compacting under pressure vari-sized pieces of crude titanium sponge containing 1.5% magnesium chloride and 1.1% magnesium metal. This was employed as a consumable electrode and melted by an arc playing between the bottom and an 8 inch table rotating at 300 r.p.m. The melting metal first formed a solid layer on a disk of titanium metal which had first been welded to the table surface, which was cooled from inside, and then formed a molten pool which was thrown off by centrifugal force in the form of globules. The pressure inside the apparatus was meanwhile maintained at about 200 microns of mercury absolute by evacuation. The globules impinged against the cooled side walls of the apparatus and solidified and were collected at the bottom of the apparatus in the form of irregular shaped discrete particles ranging in size from $\frac{1}{16}$ inch to $\frac{3}{16}$ inch of which a majority were roughly disk shaped. Analysis of the particles showed a magnesium chloride content of 0.3% and a magnesium metal content of 0.21%. The separated magnesium chloride and magnesium was condensed on upper portions of the cooled sidewalls.

The process of this invention, which comprises providing a consumable electrode of metal to be melted, is economical and rapid to produce a disintegrated product suited for a variety of purposes. If generally spherical particles are desired, these may be obtained. Under certain conditions, as for compacting with virgin metal such as titanium sponge, a flattened globule or irregular shaped particle may be provided for better compacting properties.

I claim:

1. Apparatus for disintegrating refractory metals comprising an enclosing shell, means for suspending a consumable electrode of said refractory metal interiorly from the top of said shell, means for supporting and rotating a table inside said shell and below the bottom of said electrode, means for maintaining an electric arc between the bottom of said electrode and refractory metal on the top of said table to progressively melt said electrode thereby to deposit on said rotating table molten metal which is thrown off said table by centrifugal force in the form of discrete particles, and means for cooling said particles.

2. Apparatus for disintegrating refractory metals comprising an enclosing shell, means for suspending a consumable electrode of said refractory metal interiorly from the top of said shell, a pedestal passing through the bottom of said shell, a table fixedly attached to the top of said pedestal, means external of said shell for rotating said pedestal and attached table, means for maintaining an electric arc between the bottom of said electrode and refractory metal on the top of said table to progressively melt said electrode thereby to deposit on said rotating table molten metal which is thrown off said table by centrifugal force in the form of discrete particles, and means for cooling said particles.

3. Apparatus for disintegrating refractory metals comprising an enclosing shell, and cooling means associated with the sidewalls of said shell for cooling said particles impinging thereon, means for suspending a consumable electrode of said refractory metal interiorly from the top of said shell, means for supporting and rotating a table inside said shell and below the bottom of said electrode, means for maintaining an electric arc between the bottom of said electrode and refractory metal on the top of said table to progressively melt said electrode thereby to deposit on said rotating table molten metal which is thrown off said table by centrifugal force in the form of discrete particles, and means for cooling said particles.

4. Apparatus for disintegrating refractory metals comprising an enclosing shell, means for suspending a consumable electrode of said refractory metal interiorly from the top of said shell, means for supporting and rotating a table inside said shell and below the bottom of said electrode, said electrode suspending means adapted to locate an electrode suspended thereby in off-center relationship to the top of said table, means for maintaining an electric arc between the bottom of said electrode and refractory metal on the top of said table to progressively melt said electrode thereby to deposit on said rotating table molten metal which is thrown off said table by centrifugal force in the form of discrete particles, and means for cooling said particles.

5. A process for disintegrating a refractory metal which comprises; forming said metal into a consumable electrode, progressively melting said electrode onto a table electrode by means of an arc playing between said consumable electrode and molten refractory metal on said table electrode, in an enclosed space devoid of contaminating gases, meanwhile rotating said table electrode to impart a rotary motion to the molten refractory metal thereon and to throw said molten refractory metal off said table electrode by centrifugal force, thereby subdividing said molten refractory metal into globules, and cooling said globules as discrete particles.

6. A process for disintegrating a refractory metal which comprises; forming said metal into a consumable electrode, progressively melting said electrode onto a table electrode by means of an arc playing between said consumable electrode and molten refractory metal on said table electrode in an enclosed space devoid of contaminating gases, meanwhile rotating said table electrode to impart a rotary motion to the molten refractory metal thereon and to throw said molten refractory metal off said table electrode by centrifugal force, thereby subdividing said molten refractory metal into globules, and cooling said globules by impingement against a cool surface to form irregular shaped discrete particles.

7. A process for disintegrating a refractory metal which comprises; forming said metal into a consumable electrode, progressively melting said electrode onto a table electrode by means of an arc playing between said consumable electrode and molten refractory metal on said table electrode in an enclosed space maintained devoid of contaminating gases by passing an inert gas therethrough, meanwhile rotating said table electrode to impart a rotary motion to the molten refractory metal thereon and to throw said molten refractory metal off said table electrode by centrifugal force, thereby subdividing said molten refractory metal into globules, and cooling said globules as discrete particles.

8. A process for disintegrating a refractory metal which comprises; forming said metal into a consumable electrode, progressively melting said electrode onto a table electrode by means of an arc playing between said consumable electrode and molten refractory metal on said table electrode in an enclosed space containing an atmosphere maintained at a pressure of less than 1 millimeter of mercury absolute, meanwhile rotating said table electrode to impart a rotary motion to the molten refractory metal thereon and to throw said molten refractory metal off said table electrode by centrifugal force, thereby subdividing said molten refractory metal into globules, and cooling said globules as discrete particles.

References Cited in the file of this patent

UNITED STATES PATENTS

| Number | Name | Date |
|---|---|---|
| 231,489 | Holtz | Aug. 24, 1880 |
| 884,571 | Cowing | Apr. 14, 1908 |
| 2,189,387 | Wissler | Feb. 6, 1940 |
| 2,208,919 | Winter et al. | July 23, 1940 |
| 2,304,130 | Truthe | Dec. 8, 1942 |
| 2,587,710 | Downey | Mar. 4, 1952 |
| 2,699,576 | Colbry et al. | Jan. 18, 1955 |
| 2,793,395 | Richardson | May 28, 1957 |
| 2,795,819 | Lezberg et al. | June 18, 1957 |